United States Patent [19]

Ikebe et al.

[11] Patent Number: 5,081,556

[45] Date of Patent: Jan. 14, 1992

[54] PROTECTIVE CASING FOR A MAGNETIC DISK

[75] Inventors: Masaru Ikebe; Haruo Shiba; Morimasa Sasaki, all of Tokyo, Japan

[73] Assignee: TDK Corporation, Tokyo, Japan

[21] Appl. No.: 559,046

[22] Filed: Jul. 30, 1990

[30] Foreign Application Priority Data

Aug. 8, 1989 [JP] Japan .................. 1-93151[U]

[51] Int. Cl.⁵ .................................. G11B 23/033
[52] U.S. Cl. .................................. 360/133; 360/137; 360/132; 206/444
[58] Field of Search .......... 360/133, 132, 137; 206/444, 312; 269/291

[56] References Cited

U.S. PATENT DOCUMENTS

| | | | |
|---|---|---|---|
| 4,669,078 | 5/1987 | Ogusu | 360/133 |
| 4,710,839 | 12/1987 | Iizuka et al. | 360/133 |
| 4,746,013 | 5/1988 | Suzuki et al. | 360/133 |
| 4,802,046 | 1/1989 | Tanaka et al. | 360/133 |
| 4,970,618 | 11/1990 | Kato et al. | 360/133 |

FOREIGN PATENT DOCUMENTS

| | | |
|---|---|---|
| 63-151416 | 11/1988 | Japan . |
| 63-151417 | 11/1988 | Japan . |
| 1-135790 | 2/1989 | Japan .................. 360/137 |
| 1-72376 | 3/1989 | Japan . |
| 1-279480 | 11/1989 | Japan .................. 360/133 |

*Primary Examiner*—Aristotelis Psitos
*Assistant Examiner*—Alfonso Garcia
*Attorney, Agent, or Firm*—Oblon, Spivak, McClelland, Maier & Neustadt

[57] ABSTRACT

A disk cartridge has a casing of resinous material which receives therein a floppy disk in a rotatable manner, the casing being formed by combining upper and lower half casings with the use of connecting ribs formed on the inner surface of at least one of the upper and lower half casings. The upper and lower half casings respectively have an outer circumferential wall at the circumference of the inner surface and an annular rib at the inner portion of the outer circumferential wall so as to define a floppy disk rotating region, wherein projections are formed in the annular rib of the upper half casing. Recesses are formed in the annular rib of the lower half casing so that the projections and the recesses are fitted to each other in a non-contacting state so as to form a complete annular wall, and sealing ribs are formed on the outer surface of the annular rib of the upper half casing so as to extend over gaps formed at the fitting portion of the projections and recesses.

8 Claims, 5 Drawing Sheets

PROTECTIVE CASING FOR A MAGNETIC DISK

BACKGROUND OF THE INVENTION

1. Field of the Invention

The present invention relates to a disk cartridge comprising a casing formed by combining a pair of half casings made of a resinous material and a disk-like recording medium such as a magnetic disk, an optical disk received in the casing.

2. Discussion of Background

A floppy disk has widely been used as an exchangeable information storage medium which can be fitted to a magnetic recording/reproducing device and can be removed from it or storage or transportation in the same manner as a magnetic tape cassette and a disk pack. 8-inch and 5-inch floppy disks have generally used. For such floppy disks, a thin flexible jacket made of vinyl chloride or the like is used as a casing to protect a magnetic disk. However, the mechanical strength of the jacket is too weak to provide sufficient protection to the magnetic disk. Since a part of the magnetic disk is exposed outside, careful attention has to be paid so as to prevent dust from being deposited on the magnetic disk. For instance, a conventional 3.5-inch floppy disk employs a casing which is formed by combining upper and lower half casings made of a resinous material by means of connecting ribs formed on the base surface of at least one of the half casings wherein each of the half casings has an outer circumferential wall at the circumference of the base surface and an annular rib for defining a magnetic disk rotating region, formed at the inner portion of the outer circumferential wall, and other necessary ribs. Such casing is strong and difficult to deform because the casing is made thick. Further, a shutter is provided at a window formed in the casing through which a magnetic head is inserted and a hub which is provided at the side of a magnetic disk is inserted into another window formed in the casing through which the magnetic disk is driven.

However, in the conventional disk cartridge, not only the connecting ribs but also other ribs formed in either of the half casings are made to contact with the other half casing. Accordingly, there is a problem that dust is apt to produce inside the casing although dust is prevented from entering from the outside of the casing. Generally, connection of the connecting ribs projecting from one of the half casings to the other half casing is carried out by applying ultrasonic vibrations to the portions to be connected to melt-bond those portions. At the moment, the mutually contacting surfaces are rubbed and a portion of the half casings are shaved to thereby generate resin powder. In particular, when ultrasonic vibrations are applied to a connecting rib or a portion near the rib, the vibrations are transmitted to the other ribs. Since the free end of the connecting ribs is formed to be slightly higher than the other ribs so as to fuse that portion, the connecting rib first comes to contact with the other half casing, and when the contacting portion of the connecting rib is fused by the application of the ultrasonic vibrations, the other ribs come to contact with the other half casing. Accordingly, an amount of the resin powder is much in the vicinity of the connecting ribs and is small in the vicinity of the other ribs. However, since the annular rib, among other ribs, formed at the inner portion of the base surface of the half casings is formed at the outer circumference of the magnetic disk, the area of contact is large, and therefore a much amount of the resin powder is produced. Further, since the annular rib is formed near the magnetic disk, there may be caused erroneous recording or reproducing if the resin powder deposits on the magnetic disk.

The inventor of this application proposed a disk cartridge as in Japanese Utility Model Application Nos. 151416/1988 and 151417/1988 wherein an annular rib which defines a magnetic disk rotating region is formed in one of the half casings so as not to contact with the other half casing to thereby suppress production of the resin powder. In the above-mentioned second application, the inventor proposed a disk cartridge having reinforcing ribs which are formed on the base surface at the portion near the outside of the annular rib so as to provide rigidity required for the casing, the reinforcing ribs being formed so as to contact with the other half casing. In such disk cartridge, it is necessary to form a gap between the annular rib and the other half casing as possible so that dust does not enter into the magnetic disk rotating region. However, when the gap is formed at the same level from the base surface, the magnetic disk is apt to enter in the gap. Accordingly, the annular ribs of the upper and lower half casings are formed so that they cooperate to form a circular circumferential wall, and at least one projection and recess are formed in the main portion of the annular ribs so that the projection and the recess are fitted to each other.

The above-mentioned construction will be described with reference to FIG. 6. The main portion of an annular rib 12 is formed in an upper half casing 10 so that the level of the free end of the annular rib 12 is substantially the same height from the base surface 14 of the upper half casing 10. Further, projections 16 (16a, . . . 16d) are respectively formed at the four corner portions of the base surface 14 of the upper half casing 10. Similarly, as shown in FIG. 7, the main portion of an annular rib 20 is formed on the base surface 22 of a lower half casing 18, which is paired with the upper half casing 10, so that the level of the free end of the annular rib 20 is substantially the same height from the base surface 22. Further, recesses 24 (24a, . . . 24c) are respectively formed at the four corner portions of the base surface 22 of the lower half casing 18. The positions of the recesses 24 are determined so as to correspond to those of the projections 16. Gaps 26 (26a, 26b) having a dimension as large as 2 mm are formed at both sides of a projection 16 which is to be fitted to one of the four fitting portions in the casing when the upper and lower half casings are combined as shown in FIG. 8. This gap is necessary in the consideration of precision of machining metal dies for molding the half casings and the fluctuation of molded products. In the conventional disk cartridge, dust is apt to enter into a magnetic disk rotating region through the gap 26 at the fitting portion of the projection 16 and the recess 24. The other gap 28 formed between other ribs and a half casing is as small as about 0.1 mm, and it does not cause a serious problem.

SUMMARY OF THE INVENTION

It is an object of the present invention to provide a disk cartridge which suppresses occurrence of errors in recording and reproducing due to dust by preventing the dust from entering into a magnetic disk rotating region through a gap formed at the fitting portion for a projection and a recess which are formed in annular ribs of the upper and lower half casings.

The foregoing and other objects of the present invention have been attained by providing a disk cartridge which comprises a disk-like recording medium and a casing of resinous material which receives therein the disk-like recording medium in a rotatable manner, said casing being formed by combining upper and lower half casings with use of connecting ribs formed on the inner surface of at least one of the upper and lower half casings which respectively have an outer circumferential wall at the circumference of the inner surface and an annular rib at the inner portion of the outer circumferential wall so as to define a disk-like recording medium rotating region, wherein at least one projection is formed in the annular rib of either the upper half casing or the lower half casing; at least one recess is formed in the annular rib of the other so that the projection and the recess are fitted to each other in a non-contacting state so as to form a complete annular wall, and sealing ribs are formed on the outer or inner surface of the annular rib of at least one of the upper and lower half casing so as to extend over gaps formed at a the fitting portion of the projection and recess.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
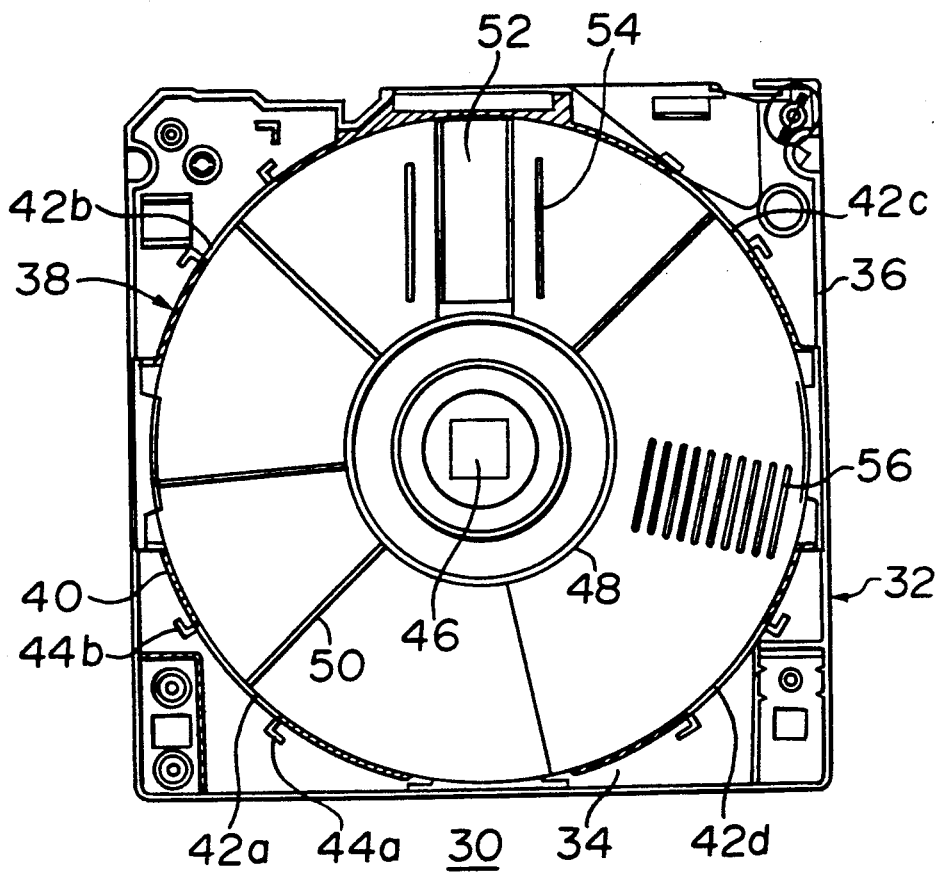
FIG. 1 is a plane view of the inner surface of the upper half casing of the magnetic disk cartridge of an embodiment according to the present invention.
Figure 2:
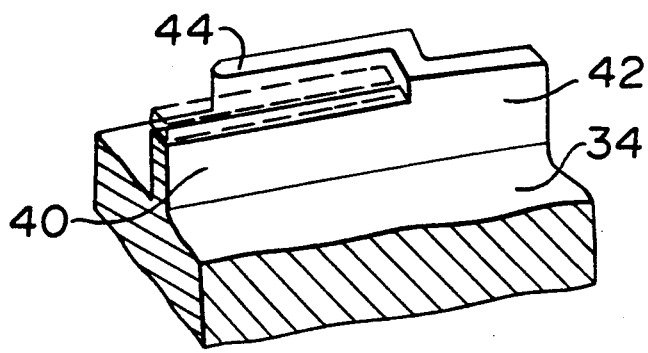
FIG. 2 is an enlarged perspective view partly omitted which shows a projection formed in the upper half casing shown in FIG. 1.

Referring to the drawings wherein the same reference numerals designate the same or corresponding parts throughout the several views, and more particularly to FIG. 1 thereof, there is shown a plane view of an embodiment of the disk cartridge of the present invention. In FIG. 1, a reference numeral 30 designates an upper half casing made of a resinous material and a numeral 32 designates a base plate having a square shape. In the inner surface or the base surface 34 of the base plate 32, an outer circumferential wall 36 which continuously extends to the four sides of the square base plate 32 and an annular rib 38 which forms a magnetic disk rotating region at the inner part of the outer circumferential wall 36 are respectively formed in the vertical direction. The annular rib 38 comprises a main portion 40 which substantially continuously surrounds the outer circumference of a magnetic disk and projections 42 (42a, . . . 42d) formed near the four corner portions of the square base plate 32 so as to project from the upper edge of the annular rib 38. The projections 42 extend toward the other half casing but are not in contact with it. At both ends of each of the projections 42, there are formed sealing ribs 44 (44a, 44b) having an L-shape which covers outwardly gaps formed at fitting portion as shown in FIG. 2. In FIG. 2, dotted lines indicate a part of the main portion of the annular rib formed in the lower half casing. The sealing ribs may be formed so that they cover the gaps inwardly; may be formed integrally with the main portion 40 of the annular rib or the base surface 34, or may have a desired shape.

At the radially inner part of the annular rib 38, there are a hub-driving shaft bearing portion 46 having a square shape at the center of the base surface 34, an annular rib 48 for restricting the position of the hub which is formed at the outside of the bearing portion 46 and linear ribs 50 extending in the radial direction of the annular rib 48 so as to restrict the movement of the magnetic disk in the vertical direction. Further, there is formed a rectangular window 52 which allows insertion of a magnetic head which is formed at the inner part in the radial direction of the annular rib 38, and linear ribs 54 formed near the window 52 so as to restrict the movement of the magnetic disk in the vertical direction. There are also formed a number of linear ribs 56 which are formed at the positions corresponding to a lifter provided at the lower half casing so as to restrict the movement of the magnetic disk in the vertical direction.

Figure 3:
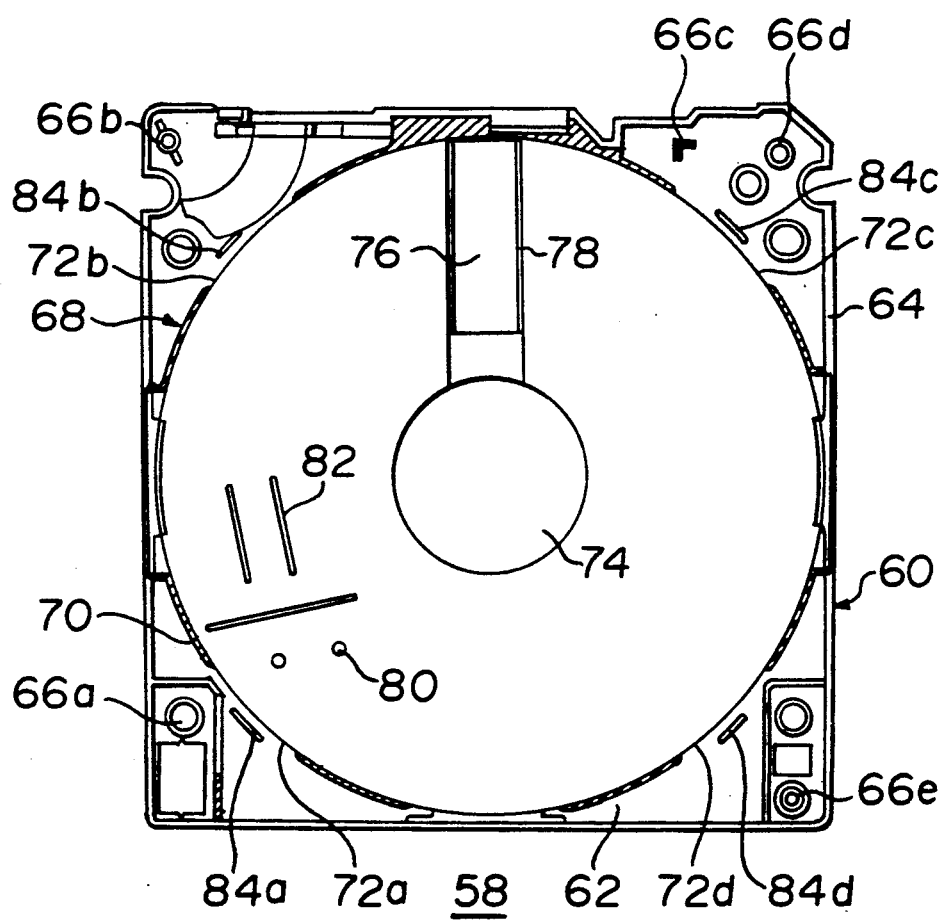
FIG. 3 is a plane view of the inner surface of the lower half casing of an embodiment according to the present invention, the lower half casing being assembled with the upper half casing.

FIG. 3 is a plane view showing the inner surface of an embodiment of the lower half casing which is paired with the upper half casing. In FIG. 3, a reference numeral 58 designates the lower half casing, mentioned before, made of a resinous material and a numeral 60 designates a square base plate. The base plate 60 has an outer circumferential wall 64 which extends vertically from the inner surface or the base surface 62 of the base plate 60 and continuously extends around the four sides of the base plate 60, and vertical ribs for melt-bonding 66 (66a, . . . 66e) formed near the four corners so as to extend the same direction as the outer circumferential wall 64. The outer circumferential wall 64 and the five ribs for melt-bonding 66 project so as to come into contact with the upper half casing 30. The ribs for melt-bonding are formed at at least one of the half casings.

An annular rib 68 for defining a magnetic disk rotating region at the central portion is formed on the inner surface 62 of the base plate 60 so as to extend in the vertical direction. The annular rib 68 comprises a main portion 70 so as to surround the outer circumference of the magnetic disk, and recesses for fitting 72 (72a, . . . 72d) which are formed in the main portion 70. The annular rib 68 is formed close to the-annular rib 38 of the upper half casing when the both half casings are combined, but does not contact with it. Each of the recesses 72 are formed at the positions corresponding to the positions of the projections 42 of the upper half casing 30. The recesses 72 are shown as cut portions of the main portion 70, so that the main portion 70 is shown as a discrete annular rib in FIG. 3.

Figure 4:
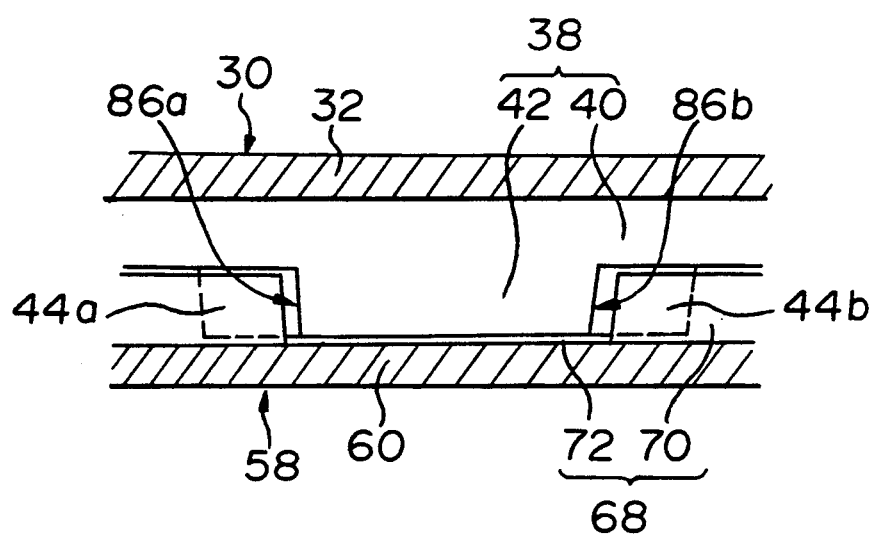
FIG. 4 is an enlarged longitudinal cross-sectional view partly omitted which shows annular ribs and the neighboring portion in the disk cartridge.
Figure 5:
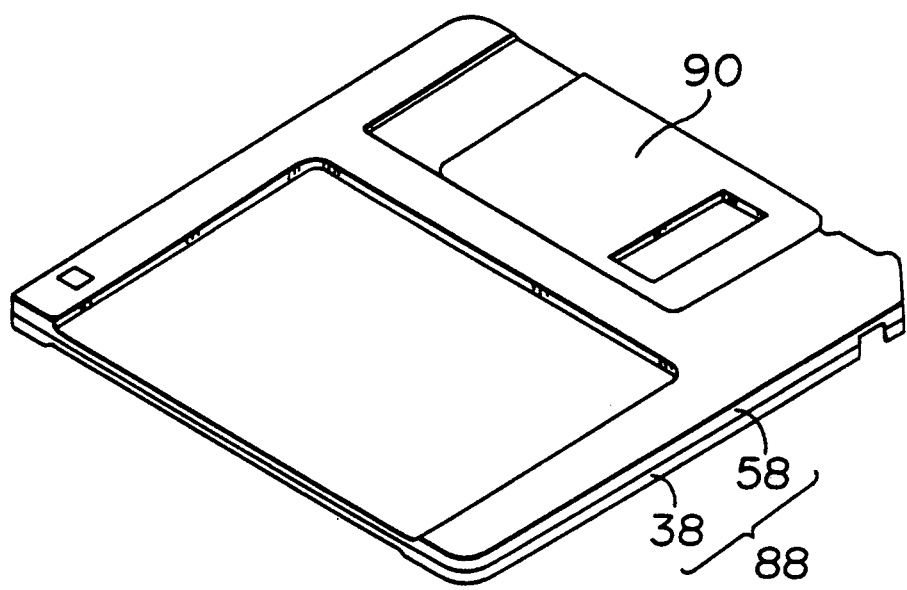
FIG. 5 is a perspective view of the disk cartridge.
Figure 6:
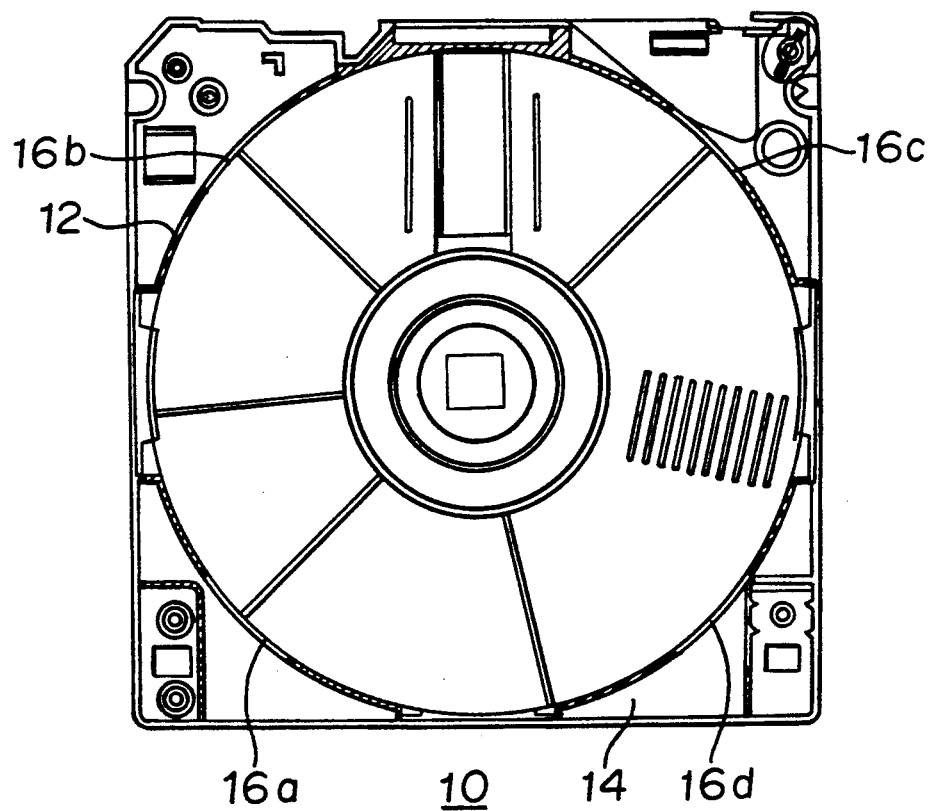
FIG. 6 is a plane view of the inner surface of the upper half casing of a conventional magnetic disk cartridge.
Figure 7:
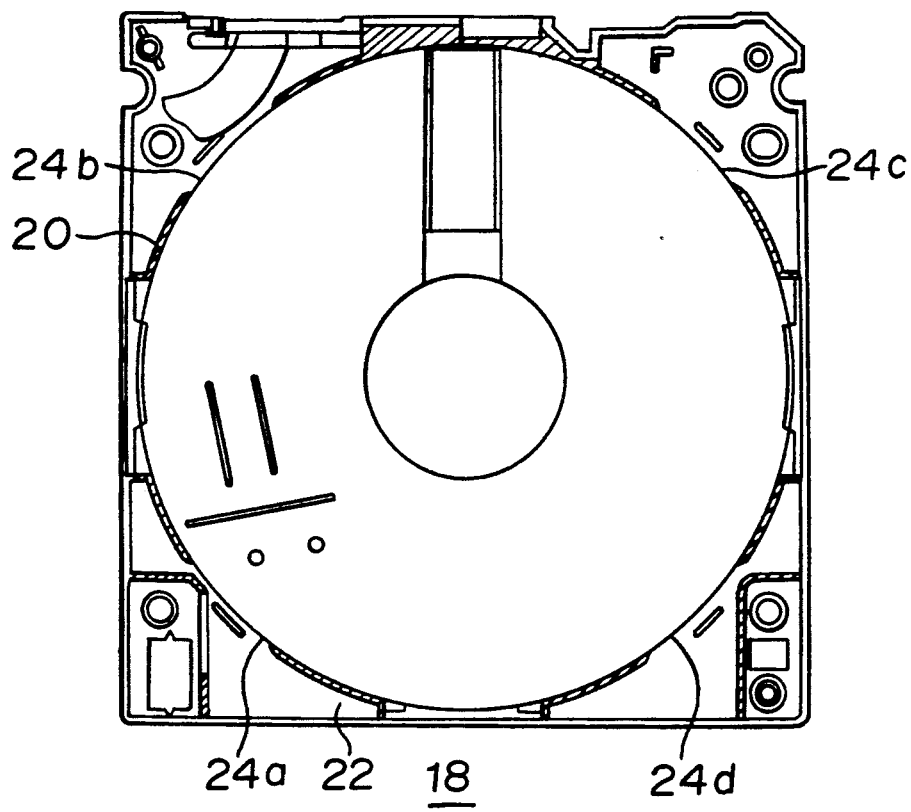
FIG. 7 is a plane view of the inner surface of the lower half casing of the conventional disk cartridge.
Figure 8:
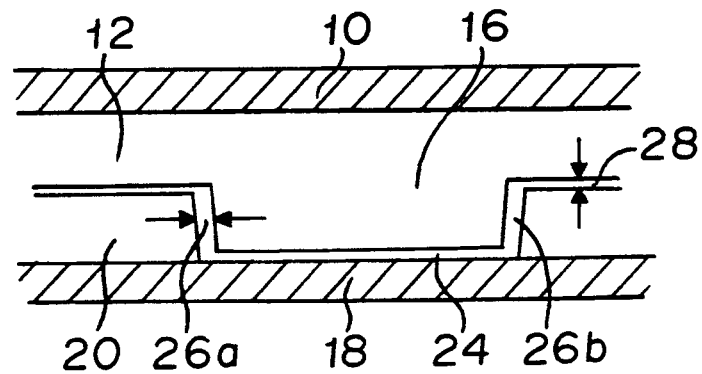
FIG. 8 is an enlarged longitudinal cross-sectional view partly omitted which shows the fitting portion of annular ribs of the conventional disk cartridge.

At the radially inner part of the annular rib 68, there are formed a magnetic disk driving window 74 formed at the center of the base surface 62, a magnetic head insertion window 76 formed at a portion apart from the central window 74 in the radial direction, linear ribs 78 formed at both sides of the magnetic head insertion window 76 to restrict the vertical movement of the magnetic disk. Circular rod-like ribs 80 for fixing the lifter and linear ribs 82 for receiving the lifter are respectively provided. Further, reinforcing ribs 84 (84a, . . . 84d) are respectively formed at the outside of the recesses 72 of the annular rib 68 so as to assure the rigidity of the casing and so as to be in contact with the upper half casing 30. After the magnetic disk has been put inside the upper and lower half casings 30, 58, ultrasonic vibrations are applied to the portions to be connected to thereby melt-bond the ribs 66 to the upper half casing 30. Then, the outer circumferential walls 36, 64 of the upper and lower half casings 30, 58 are brought into contact with each other and the reinforcing ribs 84 of the lower half casing 58 are brought into contact with the upper half casing 30. However, the annular ribs 38, 68 do not contact with each other but they come close as shown in FIG. 4. Namely, each of the projections 42 is fitted to each of the recesses 72 so that a complete circle of wall which defines the magnetic disk rotating region is formed by the cooperation of the projections 42 and the recesses 72. Although gaps 86 (86a, 86b) are formed at fitting portions of the projections and recesses, the sealing ribs 44 cover the gaps from the outside, whereby entrance of dust into the magnetic disk rotating region can be prevented. In particular, the sealing of the gaps can be effectively done by forming the sealing ribs 44 having an L-shape at both ends of the outer surface of each of the projections 42 of the annular rib 38. It is necessary that the other ribs projecting from the upper and lower half casings 38, 58 are not in contact with the opposing half casing. A shutter 90 is mounted on a predetermined position of the casing 88 formed by combining the upper and lower half casings 38, 58 to thereby complete the magnetic disk cartridge as shown in FIG. 5.

Thus, in accordance with the disk cartridge of the present invention, it is possible to prevent dust from entering in the magnetic disk rotating region because of a unique construction of the annular ribs 38, 68 although dust is produced in the outer region where melt-bonding ribs are formed. Accordingly, erroneous recording and reproducing due to dust can be greatly reduced.

Further, entrance of dust can be effectively prevented by forming sealing ribs at projections formed in one of annular ribs to cover the gaps formed at the fitting portions of the projections and the recesses.

Obviously, numerous modifications and variations of the present invention are possible in light of the above teachings. It is therefore to be understood that within the scope of the appended claims, the invention may be practiced otherwise than as specifically described herein.

What is claimed is:

1. A casing for receiving a disk-like recording medium in a rotatable manner, said casing comprising:
    an upper half casing having an upper inside surface and an outer circumferential wall at an outer periphery of said upper inside surface;
    a lower half casing having a lower inside surface and an outer circumferential wall at an outer periphery of said lower inside surface;
    an upper annular rib formed on said upper inside surface and projecting toward said lower inside surface;
    a lower annular rib formed on said lower inside surface and projecting toward said upper annular rib;
    a disk-like recording medium rotating region defined radially inward of said upper and lower annular ribs;
    at least one recess formed in one of said upper and lower annular ribs;
    at least one projection formed on the other of said upper and lower annular ribs, said at least one projection being received within said at least one recess in a non-contacting state such that gaps are formed between said at least one recess and said at least one projection; and
    a first sealing rib extending adjacent to and overlapping with said upper and lower annular ribs so as to cover at least one of said gaps to prevent dust from entering said disk-like recording medium rotating region.

2. The casing according to claim 1, wherein said first sealing rib is integrally formed on said at least one projection.

3. The casing according to claim 1, wherein said first sealing rib is L-shaped.

4. The casing according to claim 1, wherein said first sealing rib is L-shaped and formed at a first end of said at least one projection, and wherein a second L-shaped sealing rib is formed at a second end of said at least one projection, said second sealing rib covering another one of the gaps between said at least one projection and said at least one recess.

5. The casing according to claim 4, wherein said first and second sealing ribs have a height equal to a height of said at least one projection.

6. The casing according to claim 1, further comprising reinforcing ribs located outside of said disk-like recording medium rotating region, said reinforcing ribs projecting from one of said upper and lower inside surfaces and contacting the other of said upper and lower inside surfaces.

7. The casing according to claim 1, further comprising melt-bonding ribs located outside of said disk-like recording medium rotating region, said melt-bonded ribs joining said upper and lower half casings.

8. The casing according to claim 1, wherein said upper and lower annular ribs do not contact one another.

* * * * *